United States Patent
Rudoy et al.

[11] Patent Number: 5,312,147
[45] Date of Patent: May 17, 1994

[54] ELECTROMECHANICAL HIGH LOAD SEPARATION APPARATUS WITH A SMOOTH RELEASE

[75] Inventors: Edward Rudoy, Woodland Hills; Leslie Kerek, Los Angeles, both of Calif.

[73] Assignee: G & H Technology, Inc., Camarillo, Calif.

[21] Appl. No.: 103,575

[22] Filed: Aug. 9, 1993

[51] Int. Cl.⁵ .............................................. B66C 1/34
[52] U.S. Cl. ................................. 294/82.3; 294/82.32; 294/82.34
[58] Field of Search .................... 294/82.24–82.27, 294/82.3–82.34, 88, 106, 110.1, 115, 116

[56] References Cited

U.S. PATENT DOCUMENTS

| | | |
|---|---|---|
| 1,027,481 | 5/1912 | Huff . |
| 1,190,491 | 7/1916 | Watts et al. . |
| 1,929,869 | 10/1933 | Hassner . |
| 2,800,355 | 7/1957 | Vinner et al. .......................... 294/88 |
| 2,941,835 | 6/1960 | Musser ......................... 294/82.32 X |
| 3,012,811 | 12/1961 | Sandrock . |
| 3,075,800 | 1/1963 | Rowekamp ............................ 294/88 |
| 3,081,122 | 3/1963 | Jungersen ....................... 294/82.32 |
| 3,109,677 | 11/1963 | Hoover . |
| 3,240,520 | 3/1966 | Dailey et al. ................. 294/82.32 X |
| 3,471,191 | 10/1969 | Schwab ........................... 294/116 X |
| 3,718,951 | 3/1973 | Pasbrig . |
| 3,795,420 | 3/1974 | Preston ............................. 294/88 X |
| 3,810,671 | 5/1974 | Jeffery ......................... 294/82.32 X |
| 3,877,343 | 4/1975 | Newell et al. . |
| 4,017,112 | 4/1977 | Delest ........................... 294/110.1 X |
| 4,258,888 | 3/1981 | Sawn . |
| 4,810,017 | 3/1989 | Knak et al. ................... 294/82.32 X |
| 5,064,235 | 11/1991 | Lessard . |
| 5,131,705 | 7/1992 | Gluck et al. . |

*Primary Examiner*—Johnny D. Cherry
*Attorney, Agent, or Firm*—Thomas I. Rozsa; Tony D. Chen

[57] ABSTRACT

The present invention is an electromechanical high load separation apparatus with a smooth release which can be utilized in various applications such as a structural separation mechanism for a nut/bolt, a cable release mechanism, or a replacement of cable cutters.

20 Claims, 2 Drawing Sheets

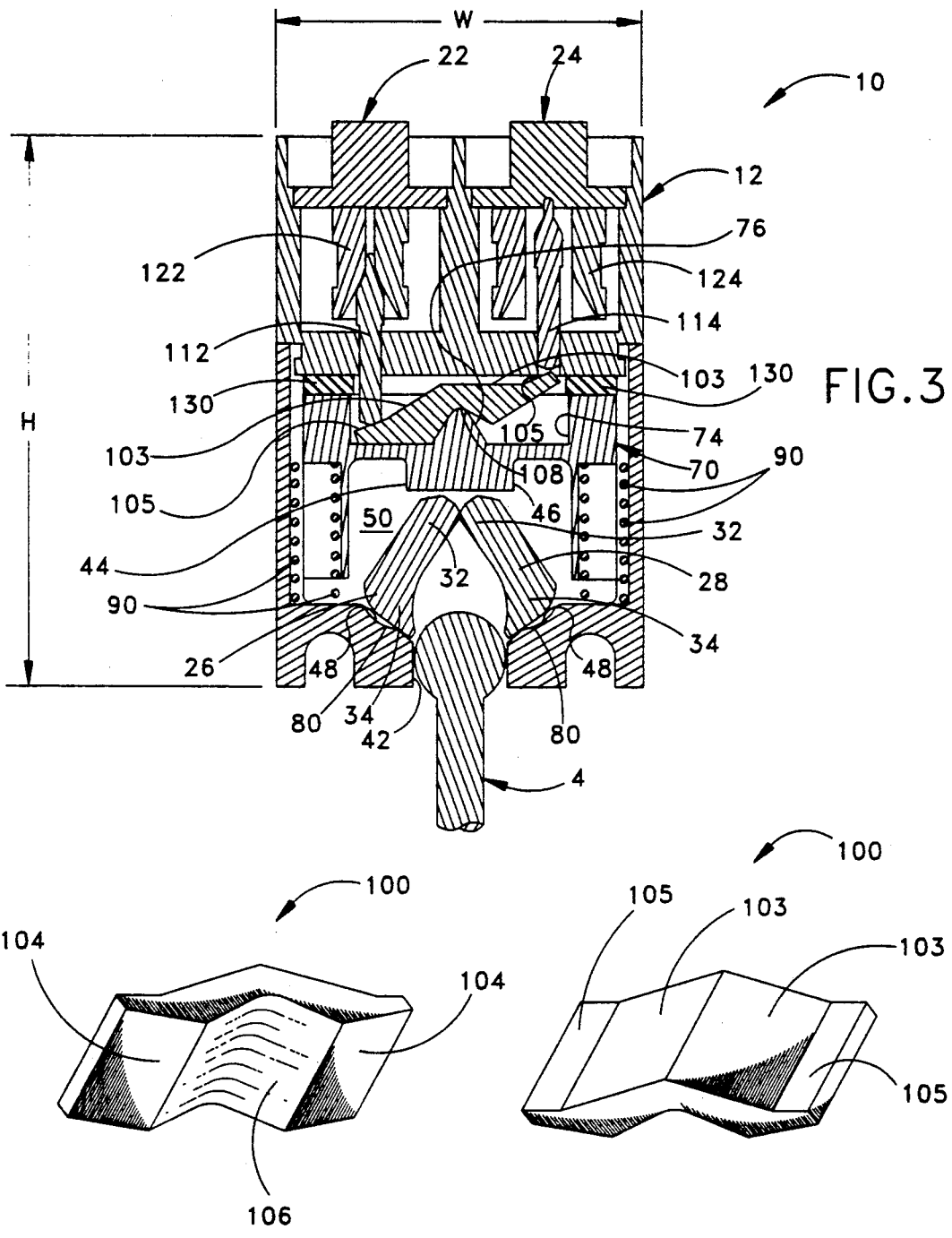

ELECTROMECHANICAL HIGH LOAD SEPARATION APPARATUS WITH A SMOOTH RELEASE

BACKGROUND OF THE INVENTION

1. Field of The Invention

The present invention relates to the field of separation mechanisms. In particular, the present invention is an electromechanical high load separation apparatus with a smooth release which can be used in various applications such as a structural separation mechanism for a nut/bolt, a cable release mechanism, a replacement of cable cutters, etc.

2. Description of The Prior Art

Separation devices are widely used in manufacturing and construction industries. The main purpose of utilizing separation devices is to provide a release in a quick releasible manner of the external attached structure in a smooth manner without damaging the external structure. The following ten (10) prior art patents were uncovered in the pertinent field of the present invention:

1. U.S. Pat. No. 1,027,481 issued to Huff on May 28, 1912 for "Releasing Hook for Life Boats and the Like" (hereafter "the Huff Patent").
2. U.S. Pat. No. 1,190,491 issued to Dunn on Jul. 11, 1916 for "Coupling" (hereafter "the Dunn Patent").
3. U.S. Pat. No. 1,929,869 issued to Hissner on Oct. 10, 1933 for "Quick Change Chuck" (hereafter "the Hässner Patent").
4. U.S. Pat. No. 3,012,811 issued to Sandrock on Dec. 12, 1961 for "Gripping Tool" (hereafter "the Sandrock Patent").
5. U.S. Pat. No. 3,109,677 issued to Hoover on Nov. 5, 1963 for "Self-Releasing Grappling Device" (hereafter "the Hoover Patent").
6. U.S. Pat. No. 3,718,951 issued to Pasbrig on Mar. 6, 1973 for "Rope Clamp" (hereafter "the Pasbrig Patent").
7. U.S. Pat. No. 3,877,343 issued to Newell on Apr. 15, 1975 for "Stores Carriers" (hereafter "the Newell Patent").
8. U.S. Pat. No. 4,258,888 issued to Sawn on Mar. 31, 1981 for "Quick Releasing High Strength Connector" (hereafter "the Sawn Patent").
9. U.S. Pat. No. 5,064,235 issued to Lessard on Nov. 12, 1991 for "Automatic Sling Device" (hereafter "the Lessard Patent").
10. U.S. Pat. No. 5,131,705 issued to Glock on Jul. 21, 1992 for "Device for Remote-Controlled Grasping and Coupling" (hereafter "the Glück Patent").

The Huff Patent discloses a releasing hook for life boats and the like. The releasing hook assembly includes two gripping jaws which are bounded by a sleeve. The sleeve is biased by a spring to hold two gripping jaws close to each other for gripping the head portion of a stem. The sleeve can be pulled against the spring force to allow the separation of the two gripping jaws, to thereby release the stem.

The Dunn Patent discloses a coupling tube which includes a series of internal jaws. The internal jaws are biased by a coil spring for coupling an inserted head portion of a wire. To release the wire, an external sleeve is inserted into the tube to separate the internal jaws so that the head portion of the wire can be pulled out.

The Hissner Patent discloses a quick change chuck. The quick change chuck assembly includes two locking levers which are bounded by a slidable ring. The slidable ring has internal cam surfaces engagable with the two locking levers. The slidable ring is biased by a coil spring for closing the locking levers to lock an inserted collar. When the slidable ring is slid against the spring force, the internal cam surfaces force the two locking levers to open for releasing the collar.

The Sandrock Patent discloses a gripping tool. The gripping tool has two grasping members which are pivotally mounted on the tool and operable by the up and down movement of a plunger. The plunger has a necked down portion for allowing the two grasping members to move closer or apart, depending on the moving direction of the plunger.

The Hoover Patent discloses a self-releasing grappling device. The grappling device includes two separable jaws for grappling a lifting lug. An external releasing sleeve is attached to the lifting lug and is utilized for engaging the two separable jaws and forcing them to open to release the lifting lug.

The Pasbrig Patent discloses a rope clamp. The clamp assembly includes two elongated clamping members which are bound by a clamping body and biased by a shackle spring. The elongated clamping members are further connected to a spring biased sleeve which can be shifted to allow the clamping members to move relatively with respect to the clamping body, so that the two clamping members are separated which allows the clamped rope to release.

The Newell Patent discloses a stores carrier. The carrier assembly includes two jaws having integral cams. The carrier assembly further includes rollers which can engage on the cam to close or open the jaws.

The Sawn Patent discloses a quick releasing high strength connector. The connector assembly includes a plurality of spring biased over-center dogs for holding a load. The over-center dogs are pivotally mounted and engaged by a spring biased latching ring to lock the load. By pulling a release cable, the latching ring can be lifted up to allow the over-center dogs to rotate for releasing the load.

The Lessard Patent discloses an automatic sling lock. The sling lock assembly includes two locking pawls which are controlled by two actuating rods respectively. The actuating rods are connected to a same butt plate which is biased by a spring.

The Glück Patent discloses a remote-controlled grasping and couplingdevice. The grasping and coupling device includes two pivotally mounted load latches for holding an electrical plug connection. A slidable outer ring isprovided for binding the two load latches. The outer ring can be lifted up by a pair of forks to allow the load latches to rotate for releasing the electricalplug connection to a storage station.

It can be seen that various structures of the clamping or retaining members and spring biased sleeves have been utilized in the art. However, none of the prior art has disclosed the tiltable rocker which allows the releaseof the external structure upon actuation of any one of the two initiators. However, in many aerospace apparatus such as satellites, it is highly desirable to utilize an electromechanical high load separation apparatus with asmooth release without damaging the highly sensitive external structure.

Therefore, it is highly desirable to have a very efficient and also very effective design and construction of an electromechanical high load separation apparatus with a smooth release which can be used in various applications such as a structural separation mechanism for a nut/bolt, a cable release mechanism, a replacement of cable cutters, etc.

SUMMARY OF THE INVENTION

The present invention is an electromechanical high load separation apparatus with a smooth release which can be remotely controlled to very quickly release a load attachment element. The primary object of the present invention is to provide a smooth release mechanism for the electromechanical high load separation apparatus that can release an external attached structure without being damaged.

The present invention is a novel and unique remotely controlled go electromechanical high load separation apparatus with a smooth release particularly designed for aerospace applications. It has been discovered, according to the present invention, that in many situations such as in aerospace applications, it is highly desirable to employ electromechanical high load separation apparatuses which utilize a smooth release mechanism because the external structure is highly sensitive. Therefore, it is an important object of the present invention to provide an electromechanical high load separation apparatus which utilizes two retaining segments with a countersink shaped cavity, where the sphere of the load attachment element is held within the countersink shaped cavities, so that releasing the retaining segments and the load applied to the load attachment element will force the retaining segments into a rocking motion over the pivot points and releasing the load attachment element in a smooth releasable manner that will not damage the external structure.

It is also an object of the present invention to provide an electromechanical high load separation apparatus with a smooth release which utilizes only non-explosive releasing mechanisms that can be remotely controlled.

It is an additional object of the present invention to provide an electromechanical high load separation apparatus with a smooth release which has a very efficient and very effective design and construction.

It is a further object of the present invention to provide an electromechanical high load separation apparatus with a smooth release which includes a tiltable rocker that can be tilted in a lateral direction relative to a pivot point. The rocker can be balanced by two plunger retainers and two initiators and if any one of the two initiators is actuated, one of the two plunger retainers will penetrate through and then the rocker will tilt in order to release the load attachment element, so that the separation device satisfies the redundancy requirement of the actuating operation.

Described generally, the present invention is an electromechanical high load separation apparatus with a smooth release mechanism for attaching to an external structure and releasing the external structure in a smooth releasable manner without damaging the external structure. The preferred embodiment of the present invention electromechanical high load separation apparatus with a smooth release basically includes a load attachment element, two retaining segments, a locking sleeve, a compression spring, a tiltable rocker, a snubber, two plunger retainers, two initiators, a base, and a rectangular shaped housing. The housing has a top end, a bottom end and four sidewalls, where the bottom end has a central opening which extends into a hollow chamber of the housing. The retaining segments are located inside the hollow chamber of the housing adjacent to a bottom ledge of the bottom end. The load attachment element is generally a cylindrical shape with a sphere on one end of the load attachment element. Each retaining segment has a countersink shaped cavity where the load attachment element rests on the countersink shaped cavity. The retaining segments are held in place by a compression spring and locked in placed by the locking sleeve. The spring load is contained by the initiators through the plunger retainers and supported by the tiltable rocker. During actuation, one or both of the initiators allow the plunger retainers to penetrate through, and thereby release the spring load that drives the locking sleeve upwards. The releasing of the retaining segments and the load attachment element forces the retaining segments into a rocking motion over the pivot points, and thereby releases the load attachment element.

Two non-explosive actuator (NEA) assemblies are symmetrically mounted on the top end of the housing for operating two plunger retainers respectively. Each NEA assembly has a spool operable by the remote control signals for releasing a respective one of the two plunger retainers to move upwardly. The two plunger retainers contact the top side of the rocker symmetrically for balancing the rocker against the locking sleeve which is biased upwardly by a compression spring. When neither NEA assemblies is actuated, the retaining segments will maintain the unreleased condition. When both or either one of the NEA assemblies are actuated by the remote control signals, the retaining segments will be forced into a rocking motion over the pivot points and release the load attachment element.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a cross-sectional view of the present invention electromechanical high load separation device with a smooth release in its released condition.

FIG. 4 is an enlarged bottom perspective view of the tiltable rocker.

FIG. 5 is an enlarged top perspective view of the tiltable rocker.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is an electromechanical high load separation apparatus with a smooth release. A preferred embodiment of the high load separation apparatus includes a housing, a load attachment element, a snubber, two retaining segments, a locking sleeve, a tiltable rocker and two non-explosive actuator (NEA) assemblies. The locking sleeve is biased by a compression spring and is engaged with the two NEA assemblies through the tiltable rocker. When neither NEA assembly is actuated, the locking sleeve is engaged with the top portions of the two retaining segments, so that the top portions of the two retaining segments are held in place by the compression spring. When both or either one of the two NEA assemblies is actuated, the locking sleeve will release the two retaining segments and force the two retaining segments into a rocking motion over the pivot points, and thereby release the load attachment element.

Figure 1:
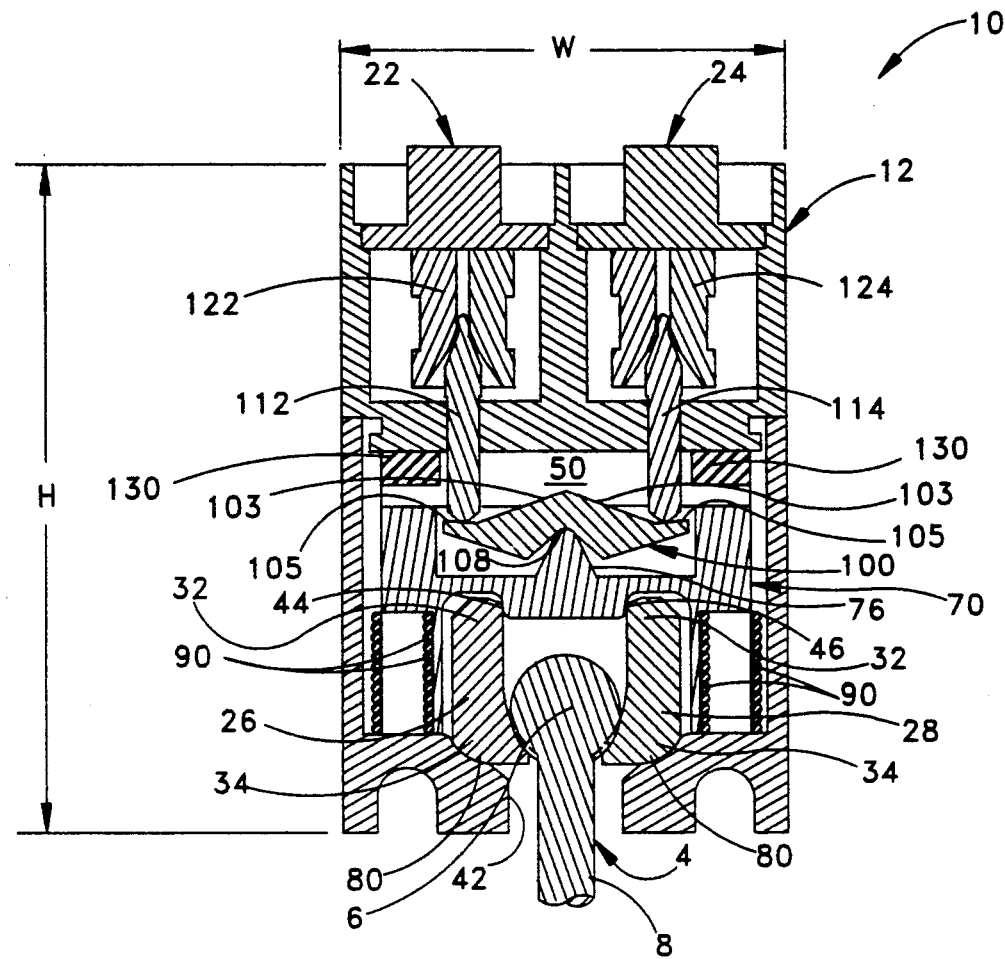
FIG. 1 is a cross-sectional view of the present invention electromechanical high load separation device with a smooth release in its unreleased condition.

Referring to FIG. 1, there is shown a cross-sectional view of a preferred embodiment of the present invention electromechanical high load separation apparatus 10 with a smooth release in its unreleased condition for retaining and releasing a load attachment element 4 which is attached to an external structure (not shown). The electromechanical high load separation apparatus 10 has a generally rectangular shaped housing 12 with a top end, a bottom end and four sidewalls. At the top end of the housing 12 there are two non-explosive actuator (NEA) assemblies 22 and 24. Remote control cables are connected respectively to the two NEA assemblies 22 and 24 for transmitting electrical or optical signals. At the bottom end of the housing 12 there is a central hole 42 extending into the housing 12 for the load attachment element 4 to extend out from the housing 12. By way of example, the overall height H, width W and thickness of the high load separation apparatus 10 are approximately 1.951 by 1.325 by 0.680 inches respectively. It will be appreciated that the dimensions described above are merely one illustrative embodiment and can include many other comparable sets of dimensions.

Figure 2:
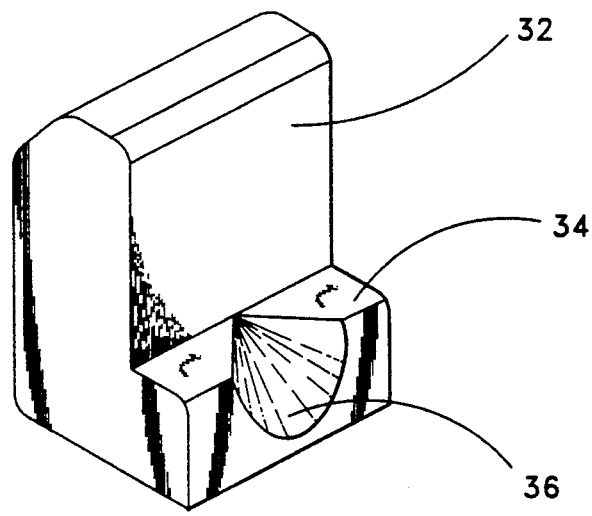
FIG. 2 is an enlarged perspective view of one of the two retaining segments.

Referring to FIGS. 1 and 2, the housing 12 of the electromechanical high load separation apparatus 10 with a smooth release has an internal hollow chamber 50. The load attachment element 4 is generally a cylindrical body with a first end 6 shaped like a sphere and a second end 8. The sphere first end 6 of the load attachment element 4 extends into the hollow chamber 50 through the bottom central hole 42 of the housing 12, and engages with two retaining segments 26 and 28, and the second end 8 is inserted through the central hole 42 of the hollow chamber 50 and extends out from the housing 12 for attaching to the external structure. The two retaining segments 26, 28 are of the same structure, therefore their parts which are identical will be described by the same reference number in the text hereinafter. Each retaining segment is generally an L-shape body with a top portion 32 and a bottom portion 34 with a countersink shaped cavity 36. The two L-shaped retaining segments 26, 28 are located inside the hollow chamber 50 of the housing 12 and adjacent to the bottom end. The sphere first end 6 of the load attachment element 4 rests on the countersink shaped cavities 36 of the two retaining segments 26, 28 for retaining the load attachment element 4 from separating from the electromechanical high load separation apparatus 10. The two retaining segments 26, 28 are confined by a locking sleeve 70. The locking sleeve 70 is placed over the top portions 32 of the retaining segments 26, 28 while the bottom portions 34 of the retaining segments rest on the bottom ledge 48 of the housing 12. When the electromechanical high load separation apparatus 10 is in the unreleased condition, the top portions 32 of the two retaining segments 26, 28 are engaged with two bottom recesses 44, 46 of the locking sleeve 70, thereby separating the top portions 32 of the two retaining segments 26, 28 apart from each other.

Referring to FIG. 3, there is shown a cross-sectional view of the present invention electromechanical high load separation apparatus 10 with a smooth release in its released condition. To separate the load attachment element 4 from the electromechanical high load separation apparatus 10, the locking sleeve 70 has to move upwards, thereby releasing the spring load that drives the locking sleeve 70. The loading weight of the load attachment element 4 will also provide a partial force to separate the two retaining segments 26, 28 into rocking motion over pivot points 80 and release the load attachment element 4.

The energy for providing the upward motion between the locking sleeve 70 and the two retaining segments 26, 28 is stored in a compression spring 90. The compression spring 90 is under compression when the electromechanical high load separation apparatus 10 with a smooth release is in the unreleased condition. The containment of the compression spring 90 is accomplished by the two NEA assemblies 22, 24 through a tiltable rocker 100 and two plunger retainers 112 and 114. The unique configuration of the tiltable rocker 100 is shown in FIGS. 4 and 5. The rocker 100 has a top side with two opposite inclined surfaces 103 and two opposite flat surfaces 105 in which the two plunger retainers 112 and 114 rest, and a bottom side with two tapered surfaces 104 and an inverted V-shape recess 106.

The purpose of using two NEA assemblies 22 and 24, and two plunger retainers 112 and 114 with the rocker 100 is to provide redundancy of actuating operation for backup and safety.

Shown in FIGS. 1 and 3, a top recess 74 with an inner protrusion 76 is provided on the locking sleeve 70 for supporting the rocker 100. When the rocker 100 is placed within the top recess 74 by having the inverted V-shape recess 106 of the rocker 100 positioned above the protrusion 76, the rocker 100 can be tilted in a lateral direction relative to the pivot point 108 of the rocker 100 without the risk of slipping off the protrusion 76. This is because first, the protrusion 76 is engaged with the inverted V-shape recess 106 of the rocker 100; and second, the rocker 100 is confined by the top recess 74 of the locking sleeve 70. The two plungers 112 and 114 are symmetrically engaged with the flat surfaces 105 of the rocker 100 in two opposite locations to hold the rocker 100 in balance.

The two NEA assemblies 22 and 24 are independently and remotely controlled by electrical, optical or other signals. The NEA assembly 22 has a spool 122 for supporting the plunger retainer 112, and the NEA assembly 24 has a spool 124 for supporting the plunger retainer 114. The plunger retainers 112 and 114 in turn keep the locking sleeve 70 from being moved upwardly by the compression spring 90, maintaining the two retaining segments 26, 28 in the unreleased condition. When one or both of the two NEA assemblies 22 and 24 are actuated, spools 122 and 124 are disengaged and allow the plunger retainers 112 and 114 to move upwardly through the respective centers of the disengaged spools 122 and 124. The plunger retainers 112 and 114 in turn allow the locking sleeve 70 to move upwardly through action of the compression spring 90, liberating the two retaining segments 26, 28 to the released condition. The spool 122 of the NEA assembly 22 is engaged and resists the movement of the plunger retainer 112, but the spool 124 of the NEA assembly 24 is disengaged and allows the movement of the other plunger retainer 114. Because the rocker 100 is pivotally supported, it allows the upward movement of the locking sleeve 70 even though only one of the two NEA assemblies is actuated, as shown in FIG. 3. This arrangement satisfies the requirement for redundancy of actuating operation. In the event this single actuation fails to release the load attachment element 4, the second NEA assembly 22 can be actuated so that spool 122 becomes disengaged, thereby permitting the plunger retainer 112 to move through spool 122 to permit the locking sleeve 70 to move upward on its other side so that the top portions 32 of the two retaining segments 26, 28 are separated to release the load attachment element 4. This redundancy feature thereby provides a duplicate operation to help prevent failure of the system.

To reduce the shock from the possible impact of the locking sleeve 70, a snubber 130 can be placed above the locking sleeve 70 as shown in FIGS. 1 and 3. The snubber 130 may be a rubber made component or a spring, and functions as a shock absorber which operates by restricting the impact of the locking sleeve 70.

The present invention electromechanical high load separation device with asmooth release has many advantageous features including: (a) it utilizes the NEA assemblies, so the separation of the two retaining segments will not disturb any other nearby highly sensitive components; (b) it can be remotely controlled by electrical, optical or other signals; (c) it satisfies the redundancy requirement of the actuating operation by employing a tiltable rocker to provide duplicate operation to reduce system failure; (d) it has a structure which is capable of tolerating very high tensile loads; (e) the releaeseof the load attachment element is very smooth so that it will not damage theexternal structure; (f) it has a very compact design and is very lightweight; and (g) it can be utilized in various applications such as a structural separation mechanism for a nut/bolt, a cable release mechanism, a replacement of cable cutters, etc.

Defined in detail, the present invention is an electromechanical high load separation apparatus with a smooth release for attaching to an external structure and release under remote control signals, the apparatus comprising: (a) a rectangular shaped housing having a top end, a bottom end and four sidewalls, the bottom end having a ledge and a central hole extending into a hollow chamber of the housing; (b) a cylindrical shaped load attachment element having a sphere first end and a second end, the second end inserted through said central hole of said bottom end of said housing and extending out from said housing for attaching to said external structure; (c) two parallel L-shaped retaining segments located inside said hollow chamber adjacent to said ledge of said bottom end of said housing, each retaining segment having a top portion and a bottom portion with a countersink shaped cavity, where the countersink shaped cavities of the two retaining segments face each other and engage with said sphere first end of said load attachment element; (d) a locking sleeve having two bottom recesses, the bottom recesses placed over said top portions of said two retaining segments respectively such that they are compressed outwardly for holding said load attachment element, and when said top portions of said two retaining segments are not engaged with the bottom recesses of the locking sleeve, said top portions of said two retaining segments can move inwardly for smoothly releasing said load attachment element; (e) a rocker placed above said locking sleeve and having a top side with two opposite flat surfaces and two opposite inclined surfaces and a tapered bottom side with a V-shaped recess for engaging a top protrusion of said locking sleeve; and (f) two non-explosive actuator assemblies symmetrically mounted on said top end of said housing for operating two plunger retainers respectively, each non-explosive actuator assembly having a spool operable by said remote control signals for allowing a respective one of the two plunger retainers to move upwardly, the two plunger retainers symmetrically contacting said two opposite flat surfaces of said rocker for balancing said rocker against said locking sleeve which is biased upwardly by a spring means; (g) whereby when neither one of said two non-explosive actuator assemblies is actuated, said two retaining segments will retain said load attachment element, and when both or either one of said non-explosive actuator assemblies are actuated by said remote control signals, said two retaining segments will be forced into a rocking motion to release said load attachment element.

Defined broadly, the present invention is an electromechanical high load separation apparatus with a smooth release for attaching to an external structure and release under remote control signals, the apparatus comprising: (a) a housing having a top end and a bottom end with a central opening extending into a hollow chamber; (b) an attachment element having a first end and a second end, the second end inserted through said central opening of said housing and extending out from said housing for attaching to said external structure; (c) two retaining segments located inside said hollow chamber adjacent to said bottom end, each retaining segment having a top portion and a bottom portion with a cavity, the cavities of the two retaining segments facing each other and engaging with said first end of said attachment element; (d) a locking sleeve placed over said top portions of said two retaining segments such that they are compressed outwardly for retaining said attachment element, and when said top portions of said two retaining segments are not engaged with the locking sleeve, said top portions of said two retaining segments can move inwardly for smoothly releasing said attachment element; (e) a rocker placed above said locking sleeve and having a top side and a bottom side with a recess for engaging a top protrusion of said locking sleeve; and (f) at least one non-explosive actuator assembly mounted on said top end of said housing for operating at least one plunger retainer, the at least one non-explosive actuator assembly having a spool operable by said remote control signal for resisting or allowing the at least one plunger retainer to move upwardly, the at least one plunger retainer contacting said top side of said rocker for balancing said rocker against said locking sleeve which is biased upwardly by a spring means; (g) whereby when said at least one non-explosive actuator assembly is not actuated, said two retaining segments will retain said attachment element, and when said at least one non-explosive actuator assembly is actuated by said remote control signals, said two retaining segments will be forced into a rocking motion to release said attachment element.

Defined more broadly, the present invention is a load separation device for attaching to an external structure, the load separation device comprising: (a) a housing having a top end and a bottom end with an opening extending into a hollow chamber; (b) an attachment element having a first end and a second end, the second end inserted through said opening of said housing and extending out from said housing for attaching to said external structure; (c) at least one retaining segment located inside said hollow chamber adjacent to said bottom end, the at least one retaining segment having a top portion and a bottom portion, the bottom portion of the at least one retaining segment engaging with said first end of said attachment element; (d) a locking sleeve biased by a spring means and placed over said top portion of said at least one retaining segment for retaining said attachment element, and when said top portion of said at least one retaining segment is not engaged with the locking sleeve, said top portion of said at least one retaining segment can move inwardly for smoothly releasing said attachment element; and (e) at least one non-explosive actuator assembly mounted on said top end of said housing for resisting or allowing said locking sleeve to move upwardly; (f) whereby when said at least one non-explosive actuator assembly is not actuated, said locking sleeve will not move upwardly to release said attachment element, and when said at least one non-explosive actuator assembly is actuated, said locking sleeve will move upwardly to release said attachment element.

Defined even more broadly, the present invention is a separation device for attaching to a structural element, comprising: (a) a housing having an opening extending into a hollow chamber; (b) a load element inserted through said opening of said housing and extending out from said housing for attaching to said structural element; (c) at least one retaining segment located inside said hollow chamber; (d) a locking sleeve biased by a spring means and placed over said at least one retaining segment for retaining said load element, such that when said at least one retaining segment is engaged with said locking sleeve, said at least one retaining segment is compressed outwardly for retaining said load element, and when said at least one retaining segment is not engaged with said locking sleeve, said at least one retaining segment can move inwardly for smoothly releasing said load element; and (e) a rocker means for preventing or allowing said locking sleeve to move.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An electromechanical high load separation apparatus with a smooth release for attaching to an external structure and release under remote control signals, the apparatus comprising:
   a. a rectangular shaped housing having a top end, a bottom end and four sidewalls, the bottom end having a ledge and a central hole extending into a hollow chamber of the housing;
   b. a cylindrical shaped load attachment element having a sphere first end and a second end, the second end inserted through said central hole of said bottom end of said housing and extending out from said housing for attaching to said external structure;
   c. two parallel L-shaped retaining segments located inside said hollow chamber adjacent to said ledge of said bottom end of said housing, each retaining segment having a top portion and a bottom portion with a countersink shaped cavity, where the countersink shaped cavities of the two retaining segments face each other and engage with said sphere first end of said load attachment element;
   d. a locking sleeve having two bottom recesses, the bottom recesses placed over said top portions of said two retaining segments respectively such that they are compressed outwardly for holding said load attachment element, and when said top portions of said two retaining segments are not engaged with the bottom recesses of the locking sleeve, said top portions of said two retaining segments can move inwardly for smoothly releasing said load attachment element;
   e. a rocker placed above said locking sleeve and having a top side with two opposite flat surfaces and two opposite inclined surfaces and a tapered bottom side with a V-shaped recess for engaging a top protrusion of said locking sleeve; and
   f. two non-explosive actuator assemblies symmetrically mounted on said top end of said housing for operating two plunger retainers respectively, each non-explosive actuator assembly having a spool operable by said remote control signals for allowing a respective one of the two plunger retainers to move upwardly, the two plunger retainers symmetrically contacting said two opposite flat surfaces of said rocker for balancing said rocker against said locking sleeve which is biased upwardly by a spring means;
   g. whereby when neither one of said two non-explosive actuator assemblies is actuated, said two retaining segments will retain said load attachment element, and when both or either one of said non-explosive actuator assemblies are actuated by said remote control signals, said two retaining segments will be forced into a rocking motion to release said load attachment element.

2. The invention as defined in claim 1 further comprising means for cushioning potential impact resulting from the upward movement of said locking sleeve biased by said spring means.

3. The invention as defined in claim 1 wherein said spring means is a compression spring wound on an exterior surface of said locking sleeve.

4. An electromechanical high load separation apparatus with a smooth release for attaching to an external structure and release under remote control signals, the apparatus comprising:

a. a housing having a top end and a bottom end with a central opening extending into a hollow chamber;

b. an attachment element having a first end and a second end, the second end inserted through said central opening of said housing and extending out from said housing for attaching to said external structure;

c. two retaining segments located inside said hollow chamber adjacent to said bottom end, each retaining segment having a top portion and a bottom portion with a cavity, the cavities of the two retaining segments facing each other and engaging with said first end of said attachment element;

d. a locking sleeve placed over said top portions of said two retaining segments such that they are compressed outwardly for retaining said attachment element, and when said top portions of said two retaining segments are not engaged with the locking sleeve, said top portions of said two retaining segments can move inwardly for smoothly releasing said attachment element;

e. a rocker placed above said locking sleeve and having a top side and a bottom side with a recess for engaging a top protrusion of said locking sleeve; and f. at least one non-explosive actuator assembly mounted on said top end of said housing for operating at least one plunger retainer, the at least one non-explosive actuator assembly having a spool operable by said remote control signal for resisting or allowing the at least one plunger retainer to move upwardly, the at least one plunger retainer contacting said top side of said rocker for balancing said rocker against said locking sleeve which is biased upwardly by a spring means;

g. whereby when said at least one non-explosive actuator assembly is not actuated, said two retaining segments will retain said attachment element, and when said at least one non-explosive actuator assembly is actuated by said remote control signals, said two retaining segments will be forced into a rocking motion to release said attachment element.

5. The invention as defined in claim 4 further comprising means for cushioning potential impact resulting from the upward movement of said locking sleeve biased by said spring means.

6. The invention as defined in claim 4 wherein said spring means is a compression spring wound on an exterior surface of said locking sleeve.

7. The invention as defined in claim 4 wherein said housing is a generally rectangular shape.

8. The invention as defined in claim 4 wherein said first end of said load attachment element is generally spherical in shape.

9. A load separation device for attaching to an external structure, the load separation device comprising:

a. a housing having a top end and a bottom end with an opening extending into a hollow chamber;

b. an attachment element having a first end and a second end, the second end inserted through said opening of said housing and extending out from said housing for attaching to said external structure;

c. at least one retaining segment located inside said hollow chamber adjacent to said bottom end, the at least one retaining segment having a top portion and a bottom portion, the bottom portion of the at least one retaining segment engaging with said first end of said attachment element;

d. a locking sleeve biased by a spring means and placed over said top portion of said at least one retaining segment for retaining said attachment element, and when said top portion of said at least one retaining segment is not engaged with the locking sleeve, said top portion of said at least one retaining segment can move inwardly for smoothly releasing said attachment element; and e. at least one non-explosive actuator assembly mounted on said top end of said housing for resisting or allowing said locking sleeve to move upwardly;

f. whereby when said at least one non-explosive actuator assembly is not actuated, said locking sleeve will not move upwardly to release said attachment element, and when said at least one non-explosive actuator assembly is actuated, said locking sleeve will move upwardly to release said attachment element.

10. The invention as defined in claim 9 further comprising means for cushioning the movement of said locking sleeve biased by said spring means.

11. The invention as defined in claim 9 wherein said spring means is a compression spring.

12. The invention as defined in claim 9 wherein said housing is a generally rectangular shape.

13. The invention as defined in claim 9 wherein said first end of said attachment element is a generally spherical shape.

14. The invention as defined in claim 9 wherein said at least one retaining segment is generally L-shaped.

15. A separation device for attaching to a structural element, comprising:

a. a housing having an opening extending into a hollow chamber;

b. a load element inserted through said opening of said housing and extending out from said housing for attaching to said structural element;

c. at least one retaining segment located inside said hollow chamber;

d. a locking sleeve biased by a spring means and placed over said at least one retaining segment for retaining said load element, such that when said at least one retaining segment is engaged with said locking sleeve, said at least one retaining segment is compressed outwardly for retaining said load element, and when said at least one retaining segment is not engaged with said locking sleeve, said at least one retaining segment can move inwardly for smoothly releasing said load element; and e. a rocker means for preventing or allowing said locking sleeve to move.

16. The invention as defined in claim 15 further comprising means for cushioning the movement of said locking sleeve biased by said spring 17. The invention as defined in claim 15 wherein said spring means is a compression spring.

18. The invention as defined in claim 15 wherein said housing is a generally rectangular shape.

19. The invention as defined in claim 15 wherein said load element is generally a cylindrical shape with a sphere first end.

20. The invention as defined in claim 15 wherein said at least one retaining segment is generally L-shaped with a countersink cavity.

* * * * *